US011965648B2

(12) United States Patent
Shimotaya et al.

(10) Patent No.: US 11,965,648 B2
(45) Date of Patent: Apr. 23, 2024

(54) FALSE WINDOW UNIT AND FALSE WINDOW

(71) Applicant: Panasonic Intellectual Property Management Co., Ltd., Osaka (JP)

(72) Inventors: Ryou Shimotaya, Osaka (JP); Takashi Higashida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/642,036

(22) PCT Filed: Oct. 29, 2020

(86) PCT No.: PCT/JP2020/040674
§ 371 (c)(1),
(2) Date: Mar. 10, 2022

(87) PCT Pub. No.: WO2021/085545
PCT Pub. Date: May 6, 2021

(65) Prior Publication Data
US 2022/0404010 A1 Dec. 22, 2022

(30) Foreign Application Priority Data
Oct. 31, 2019 (JP) .................... 2019-198477

(51) Int. Cl.
*F21V 33/00* (2006.01)
*E04F 13/072* (2006.01)
(Continued)

(52) U.S. Cl.
CPC ........ *F21V 33/0024* (2013.01); *E04F 13/072* (2013.01); *E06B 7/28* (2013.01); *E04F 2290/026* (2013.01); *F21Y 2115/10* (2016.08)

(58) Field of Classification Search
CPC ....... E06B 7/28; E04F 13/072; F21V 33/0024
See application file for complete search history.

(56) References Cited

U.S. PATENT DOCUMENTS 1,607,922 A * 11/1926 Schweitzer ............. F21V 33/00
362/1
5,251,392 A * 10/1993 McManigal ............ G09F 27/00
40/442
(Continued)

FOREIGN PATENT DOCUMENTS

JP        09-205602 A      8/1997
JP        2008-202283 A    9/2008
(Continued)

OTHER PUBLICATIONS

International Search Report dated Dec. 28, 2020 in International Patent Application No. PCT/JP2020/040674, with English translation.

*Primary Examiner* — Evan P Dzierzynski
*Assistant Examiner* — Nathaniel J Lee
(74) *Attorney, Agent, or Firm* — Rimon P.C.

(57) ABSTRACT

A false window unit includes: a window frame which is disposed in a wall and includes an opening; an image display device which is disposed facing the opening of the window frame, and displays a landscape image toward the indoor space through the opening of the window frame; a light source which is disposed between the window frame and the image display device, and emits light simulating sunlight toward the indoor space through the opening of the window frame; and a sash frame which blocks part of the light from the light source.

20 Claims, 9 Drawing Sheets

(51) Int. Cl.
*E06B 7/28* (2006.01)
*F21Y 115/10* (2016.01)

(56) References Cited

U.S. PATENT DOCUMENTS

| | | | | |
|---|---|---|---|---|
| 5,253,051 A | * | 10/1993 | McManigal | G09F 13/04 |
| | | | | 348/121 |
| 2009/0273302 A1 | | 11/2009 | Staats et al. | |
| 2010/0059767 A1 | * | 3/2010 | Kawasaki | G02F 1/133615 |
| | | | | 257/89 |

FOREIGN PATENT DOCUMENTS

| | | |
|---|---|---|
| JP | 2008-545905 A | 12/2008 |
| WO | 2006/129268 A2 | 12/2006 |

* cited by examiner

FIG. 6

| Time of day | Illuminance | Color temperature | Left lateral light source | Upper left light source | Upper right light source | Right lateral light source | Perception of sunlight |
|---|---|---|---|---|---|---|---|
| Morning | High | High | ON | OFF | OFF | OFF | Refreshing morning sunlight |
| Daytime | Medium | Medium | OFF | ON | ON | OFF | Seasonal sunlight |
| Early evening | Low | Low | OFF | OFF | OFF | ON | Twilight sunset |

FALSE WINDOW UNIT AND FALSE WINDOW

CROSS-REFERENCE OF RELATED APPLICATIONS

This application is the U.S. National Phase under 35 U.S.C. § 371 of International Patent Application No. PCT/JP2020/040674, filed on Oct. 29, 2020, which in turn claims the benefit of Japanese Application No. 2019-198477, filed on Oct. 31, 2019, the entire disclosures of which Applications are incorporated by reference herein.

TECHNICAL FIELD

The present disclosure relates to a false window unit and a false window.

BACKGROUND ART

For example, a false window unit is known which is installed in a room where no window can be provided because of the structure of the building (see, for example, Patent Literature (PTL) 1). A conventional false window unit includes a window frame disposed in the wall of the indoor space and an image display device disposed facing the opening of the window frame. The image display device displays a landscape image, which is a captured image of the landscape seen through an actual window, toward the indoor space through the opening of the window frame.

As a result, the landscape image projected by the false window unit looks like a landscape seen through an actual window, so that the claustrophobic feeling in the room where no window can be provided is eliminated.

CITATION LIST

Patent Literature

[PTL 1] Japanese Unexamined Patent Application Publication No. H09-205602

SUMMARY OF INVENTION

Technical Problem

The present disclosure provides a false window unit and a false window that are capable of enhancing the perception of reality.

Solution to Problem

A false window unit according to the present disclosure is a false window unit which is installed in a wall of an indoor space. The false window unit includes: a window frame which is disposed in the wall and includes an opening; an image display device which is disposed facing the opening of the window frame and displays a landscape image toward the indoor space through the opening of the window frame; a light source which is disposed between the window frame and the image display device and emits light simulating sunlight toward the indoor space through the opening of the window frame; and a light-blocking member which blocks part of the light from the light source.

Advantageous Effects of Invention

According to the false window unit in the present disclosure, it is possible to enhance the perception of reality.

BRIEF DESCRIPTION OF DRAWINGS

FIG. 6 illustrates an example of control of a light source performed by the control unit of the false window unit according to the embodiment.

DESCRIPTION OF EMBODIMENT

Hereinafter, an embodiment will be described in detail with reference to the drawings where necessary. However, more detailed explanation than necessary may be omitted. For example, detailed explanations of already well-known matters or duplicate explanations for substantially the same configuration may be omitted. This is to avoid redundancy and make the following description easier for those skilled in the art to understand.

Note that the inventors provide the accompanying drawings and the following description not to limit the scope of the claims, but to aid those skilled in the art to adequately understand the present disclosure.

(Embodiment)

Hereinafter, an embodiment will be described with reference to FIG. 1 to FIG. 9. It should be noted that, in FIG. 1 to FIG. 4 and FIG. 7 to FIG. 9, the width direction (horizontal direction) of false window unit 2 is defined as an X-axis direction, the depth direction of false window unit 2 is defined as a Y-axis direction, and the height direction (vertical direction) of false window unit 2 is defined as a Z-axis direction.

[1. Outline of False Window Unit]

Figure 1:
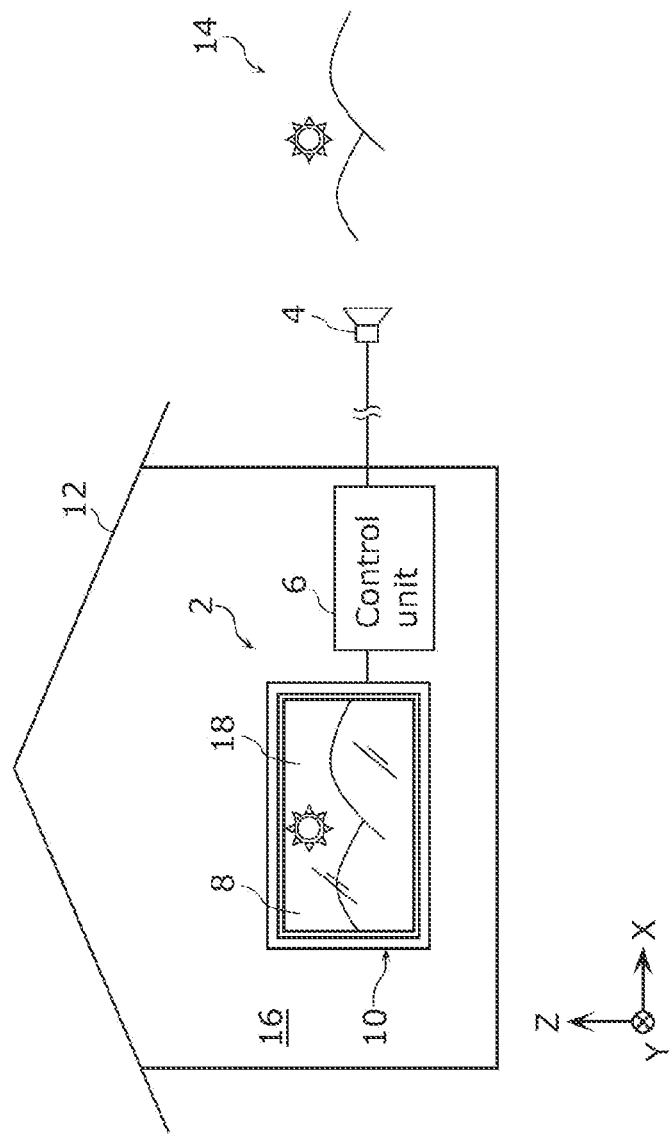
FIG. 1 illustrates an outline of a false window unit according to an embodiment.

First, an outline of false window unit 2 according to the embodiment will be described with reference to FIG. 1. FIG. 1 illustrates an outline of false window unit 2 according to the embodiment.

As illustrated in FIG. 1, false window unit 2 includes camera 4, control unit 6, image display device 8, and false window 10.

Camera 4 is disposed outside building 12, and generates a landscape image which is a video (moving image) of outdoor landscape 14 captured, for example, facing south. Camera 4 is capable of communicating with control unit 6, and transmits the generated landscape image to control unit 6. Outdoor landscape 14 captured by camera 4 is, for example, a) a natural landscape such as a mountain, a river, a forest, or a seaside, or b) a landscape of an artificial structure such as a high-rise building, a garden, or a bridge. Camera 4 also transmits the shooting condition information (to be described later) related to the shooting conditions of the landscape image to control unit 6. In the present embodiment, camera 4 is disposed outside building 12, but the present disclosure is not limited to such an example. For example, camera 4 may be disposed inside building 12 and outdoor landscape 14 may be captured by camera 4 through the window of building 12.

Control unit 6 is disposed in indoor space 16 of building 12, and controls each of image display device 8 and false window 10. Control unit 6 receives the landscape image transmitted from camera 4, and outputs the received landscape image to image display device 8. Control unit 6 also receives the shooting condition information transmitted from camera 4, and controls light source 36 (to be described later) of false window 10 based on the received shooting condition information.

Image display device 8 is, for example, a flat panel display, such as a liquid crystal display or an organic electroluminescent (EL) display, and is disposed in indoor space 16 of building 12. Image display device 8 includes display surface 18 for displaying the landscape image output from control unit 6. In other words, the landscape image captured by camera 4 is displayed in real time on display surface 18 of image display device 8.

False window 10 is, for example, a structure simulating an actual south-facing window, and is disposed in indoor space 16 of building 12. False window 10 is disposed facing display surface 18 of image display device 8.

By viewing the landscape image displayed on display surface 18 of image display device 8 through false window 10, the user is able to feel as if they are looking at outdoor landscape 14 through an actual window.

[2. Configuration of False Window Unit]

Figure 2:
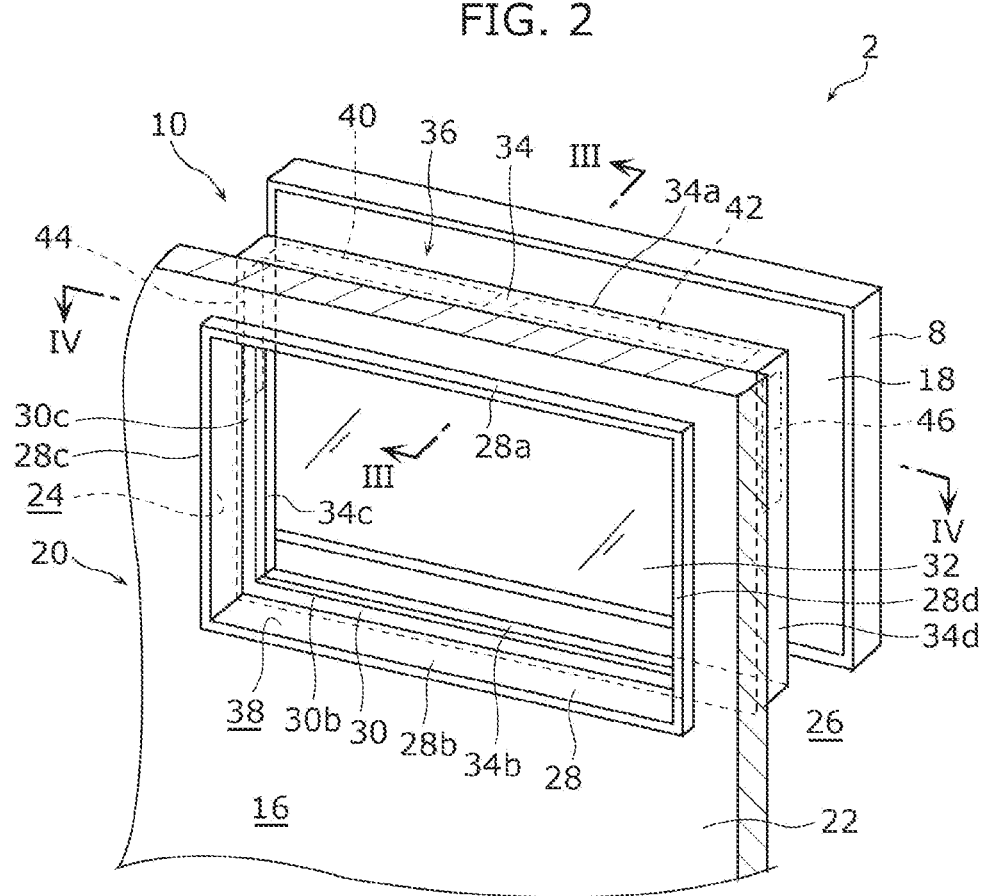
FIG. 2 is a perspective view illustrating a configuration of the false window unit according to the embodiment.
Figure 3:
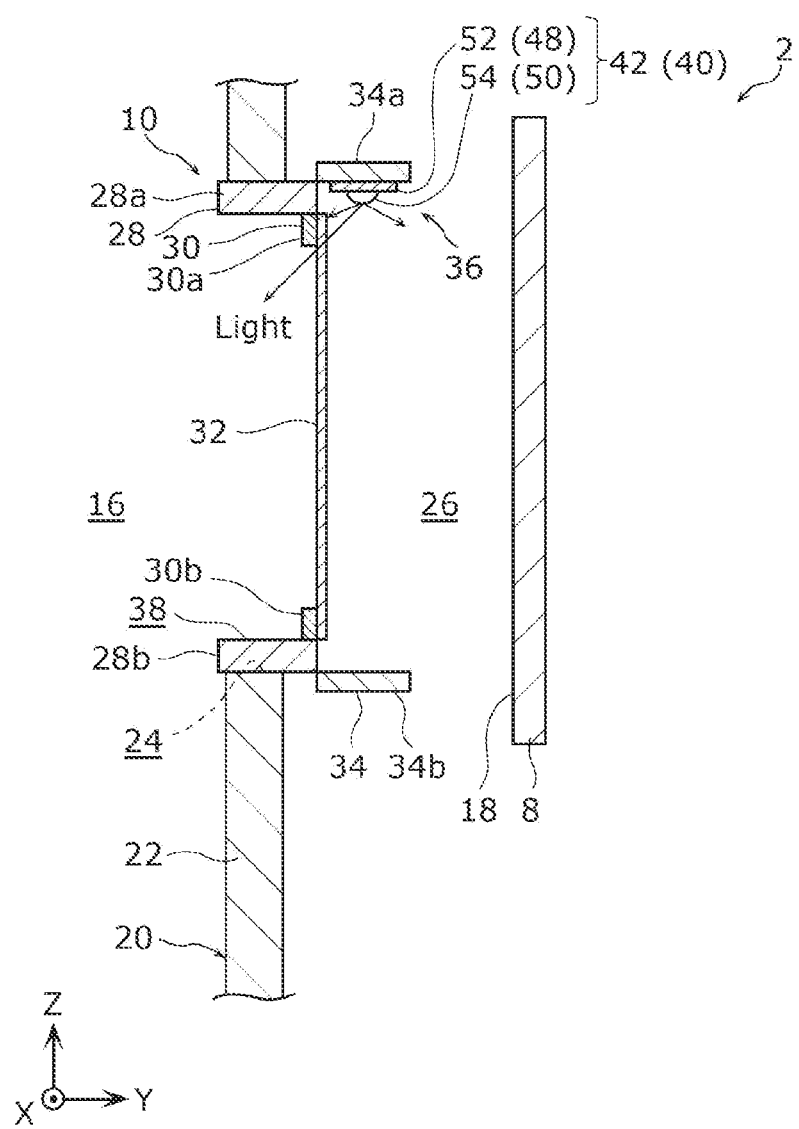
FIG. 3 is a cross-sectional view of the false window unit according to the embodiment taken along line III-III in FIG. 2.
Figure 4:
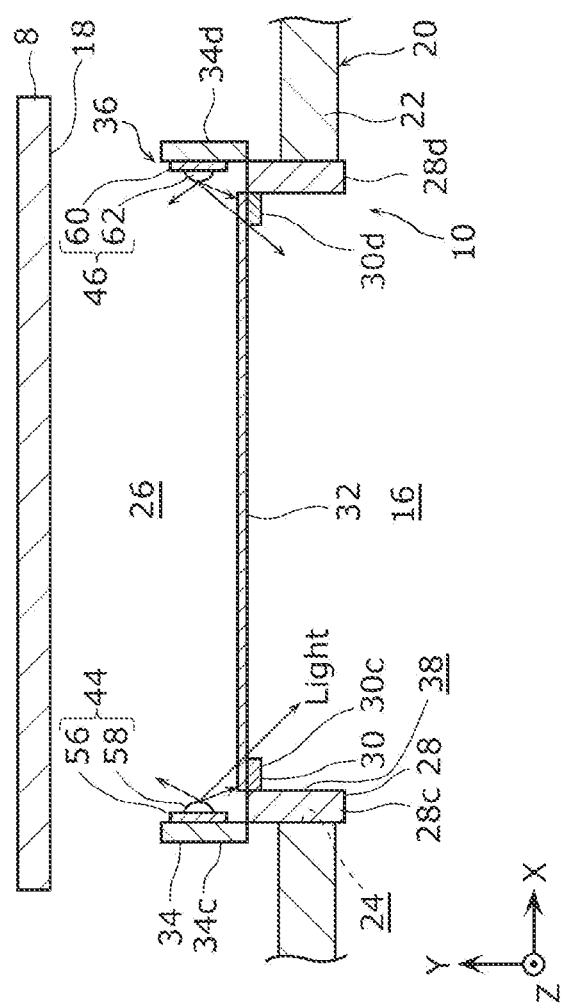
FIG. 4 is a cross-sectional view of the false window unit according to the embodiment taken along line IV-IV in FIG. 2.

Next, a configuration of false window unit 2 according to the embodiment will be described with reference to FIG. 2 to FIG. 4. FIG. 2 is a perspective view illustrating a configuration of false window unit 2 according to the embodiment. FIG. 3 is a cross-sectional view of false window unit 2 according to the embodiment taken along line III-III in FIG. 2. FIG. 4 is a cross-sectional view of false window unit 2 according to the embodiment taken along line IV-IV in FIG. 2. For the convenience of description, FIG. 2 illustrates a portion of wall 20 that is cut out.

As illustrated in FIG. 2 to FIG. 4, image display device 8 and false window 10 of false window unit 2 are disposed in wall 20 of indoor space 16. Wall 20 includes inner wall 22 facing indoor space 16 and an outer wall (not illustrated) located closer to the outside than inner wall 22 is. Moreover, indoor space 16 is a space surrounded by inner wall 22, and is, for example, a space, such as a living room. Inner wall 22 includes through-hole 24 for installing false window 10. Through-hole 24 is rectangular in shape in an X-Z plan view.

As illustrated in FIG. 2 to FIG. 4, image display device 8 is disposed in wall space 26 between inner wall 22 and the outer wall, and is supported by a support mechanism (not illustrated) at the height position corresponding to the height position (the position in the Z-axis direction) of false window 10. Display surface 18 of image display device 8 is disposed facing through-hole 24 of inner wall 22.

As illustrated in FIG. 2 to FIG. 4, false window 10 includes window frame 28, sash frame 30 (an example of a light-blocking member), window plate 32, support frame 34, and light source 36.

Window frame 28 is a frame member simulating the window frame of an actual window. Window frame 28 is rectangular in shape in an X-Z plan view, and is disposed along the peripheral edge of through-hole 24 of inner wall 22. In other words, window frame 28 is disposed facing display surface 18 of image display device 8. Window frame 28 includes upper horizontal frame 28a (see FIG. 2 and FIG. 3), lower horizontal frame 28b (see FIG. 2 and FIG. 3), left-side vertical frame 28c (see FIG. 2 and FIG. 4), and right-side vertical frame 28d (see FIG. 2 and FIG. 4) which are arranged in a rectangular shape. Here, the upper side, the lower side, the left side, and the right side respectively mean the upper side (the positive Z-axis side), the lower side (the negative Z-axis side), the left side (the negative X-axis side), and the right side (the positive X-axis side) relative to the direction from indoor space 16 toward false window 10. The region surrounded by upper horizontal frame 28a, lower horizontal frame 28b, left-side vertical frame 28c, and right-side vertical frame 28d includes opening 38 that is rectangular in shape in an X-Z plan view. Window frame 28 is made of, for example, a decorative board. In the X-Z plan view, the size of window frame 28 is smaller than the size of display surface 18 of image display device 8.

Sash frame 30 is a frame member for supporting window plate 32. Sash frame 30 is rectangular in shape in an X-Z plan view, and is disposed on the inner peripheral surface of window frame 28. More specifically, as illustrated in FIG. 3 and FIG. 4, sash frame 30 is disposed at the end of the inner peripheral surface of window frame 28 on the side closer to image display device 8. Sash frame 30 includes upper horizontal frame 30a (see FIG. 3), lower horizontal frame 30b (see FIG. 2 and FIG. 3), left-side vertical frame 30c (see FIG. 2 and FIG. 4), and right-side vertical frame 30d (see FIG. 4) which are arranged in a rectangular shape. Sash frame 30 extends radially inward from the inner peripheral surface of window frame 28. The term "radially inward" means the direction from the inner peripheral surface of window frame 28 toward the central portion of opening 38. Sash frame 30 is made of a light-blocking material, for example, a metal such as aluminum.

Window plate 32 is a plate member simulating the window glass of an actual window. Window plate 32 is rectangular in shape in an X-Z plan view, and covers opening 38 of window frame 28. The outer peripheral portion of window plate 32 is supported by sash frame 30. Window plate 32 is made of a light-transmissive material, for example, a transparent acrylic plate or a glass plate.

Support frame 34 is a frame member for supporting light source 36. Support frame 34 is rectangular in shape in an X-Z plan view, and is disposed between window frame 28 and image display device 8 along the peripheral direction of window frame 28. The term "peripheral direction" means the direction along the inner peripheral surface or the outer peripheral surface of window frame 28 in a cross section perpendicular to the axial direction (Y-axis direction) of window frame 28. Support frame 34 includes upper horizontal frame 34a (see FIG. 2 and FIG. 3), lower horizontal frame 34b (see FIG. 2 and FIG. 3), left-side vertical frame 34c (see FIG. 2 and FIG. 4), and right-side vertical frame 34d (see FIG. 2 and FIG. 4) which are arranged in a rectangular shape. Upper horizontal frame 34a, lower horizontal frame 34b, left-side vertical frame 34c, and right-side vertical frame 34d of support frame 34 are respectively disposed along upper horizontal frame 28a, lower horizontal frame 28b, left-side vertical frame 28c, and right-side vertical frame 28d of window frame 28.

Light source 36 is a light source for emitting light simulating the sunlight to indoor space 16. As illustrated in FIG. 2, light source 36 includes upper left light source 40 (an example of a first light source), upper right light source 42 (an example of the first light source), left lateral light source 44 (an example of a second light source), and right lateral light source 46 (an example of a third light source).

As illustrated in FIG. 3, upper left light source 40 includes substrate 48 which is elongated in shape and a plurality of light-emitting diodes (LEDs) 50 aligned in the lengthwise direction (X-axis direction) of substrate 48. Moreover, as illustrated in FIG. 3, upper right light source 42 includes substrate 52 which is elongated in shape and a plurality of LEDs 54 aligned in the lengthwise direction (X-axis direction) of substrate 52. Upper left light source 40 and upper right light source 42 are aligned on the inner peripheral surface of upper horizontal frame 34a of support frame 34, and are disposed in an elongated shape along the lengthwise direction (X-axis direction) of upper horizontal frame 34a. In other words, upper left light source 40 and upper right light source 42 are disposed between upper horizontal frame 28a of window frame 28 and image display device 8 along upper horizontal frame 28a. At this time, upper left light source 40 and upper right light source 42 are located at positions invisible to the user in indoor space 16. Upper left light source 40 is positioned closer to left-side vertical frame 34c of support frame 34, and upper right light source 42 is positioned closer to right-side vertical frame 34d of support frame 34.

As illustrated in FIG. 3, the light from each of upper left light source 40 and upper right light source 42 is emitted toward indoor space 16 through opening 38 of window frame 28. At this time, part of the light from each of upper left light source 40 and upper right light source 42 is blocked by upper horizontal frame 30a of sash frame 30.

As illustrated in FIG. 4, left lateral light source 44 includes substrate 56 which is elongated in shape and a plurality of LEDs 58 aligned in the lengthwise direction (Z-axis direction) of substrate 56. Left lateral light source 44 is disposed on the inner peripheral surface of left-side vertical frame 34c of support frame 34, and is disposed in an elongated shape along the lengthwise direction (Z-axis direction) of left-side vertical frame 34c. In other words, left lateral light source 44 is disposed between left-side vertical frame 28c of window frame 28 and image display device 8 along left-side vertical frame 28c. At this time, left lateral light source 44 is located at a position invisible to the user in indoor space 16.

Moreover, as illustrated in FIG. 4, right lateral light source 46 includes substrate 60 which is elongated in shape and a plurality of LEDs 62 aligned in the lengthwise direction (Z-axis direction) of substrate 60. Right lateral light source 46 is disposed on the inner peripheral surface of right-side vertical frame 34d of support frame 34, in an elongated shape along the lengthwise direction (Z-axis direction) of right-side vertical frame 34d. In other words, right lateral light source 46 is disposed between right-side vertical frame 28d of window frame 28 and image display device 8 along right-side vertical frame 28d. At this time, right lateral light source 46 is located at a position invisible to the user in indoor space 16.

As illustrated in FIG. 4, the light from each of left lateral light source 44 and right lateral light source 46 is emitted toward indoor space 16 through opening 38 of window frame 28. At this time, part of the light from left lateral light source 44 is blocked by left-side vertical frame 30c of sash frame 30. Moreover, part of the light from right lateral light source 46 is blocked by right-side vertical frame 30d of sash frame 30.

[3. Functional Configuration of Control Unit]

Figure 5:
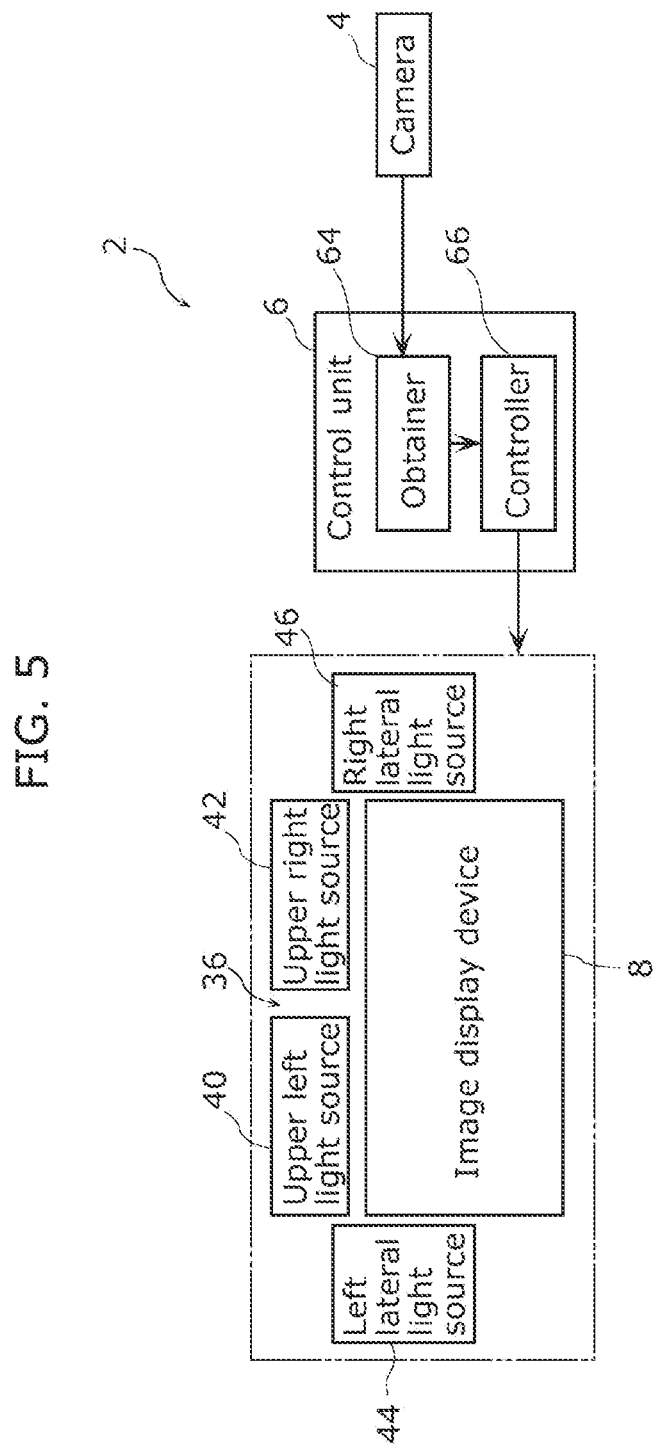
FIG. 5 is a block diagram illustrating a functional configuration of a control unit of the false window unit according to the embodiment.

Next, a functional configuration of control unit 6 will be described with reference to FIG. 5. FIG. 5 is a block diagram illustrating a functional configuration of control unit 6 of false window unit 2 according to the embodiment.

As illustrated in FIG. 5, control unit 6 includes obtainer 64 and controller 66 as a functional configuration.

Obtainer 64 obtains the landscape image transmitted from camera 4. Obtainer 64 outputs the obtained landscape image to image display device 8 via controller 66. Accordingly, the landscape image captured by camera 4 is displayed in real time on display surface 18 of image display device 8.

Obtainer 64 also obtains the shooting condition information transmitted from camera 4, and outputs the obtained shooting condition information to controller 66. Here, the shooting condition information includes, for example, a) the date when the landscape image was captured, b) the time when the landscape image was captured, and c) the weather and the like at the shooting location when the landscape image was captured.

Controller 66 controls light source 36 of false window 10 based on the shooting condition information output from obtainer 64.

Figure 7:
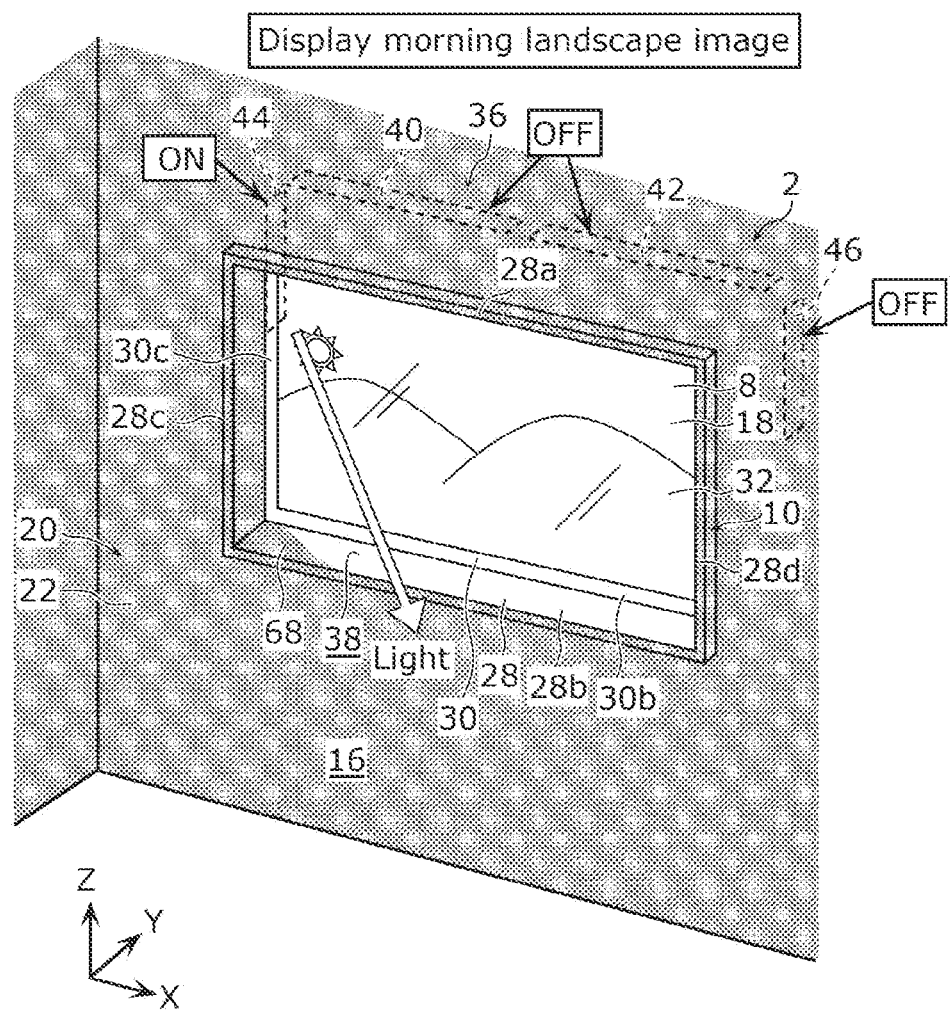
FIG. 7 is a perspective view of the false window unit according to the embodiment when a morning landscape image is displayed on the image display device.
Figure 8:
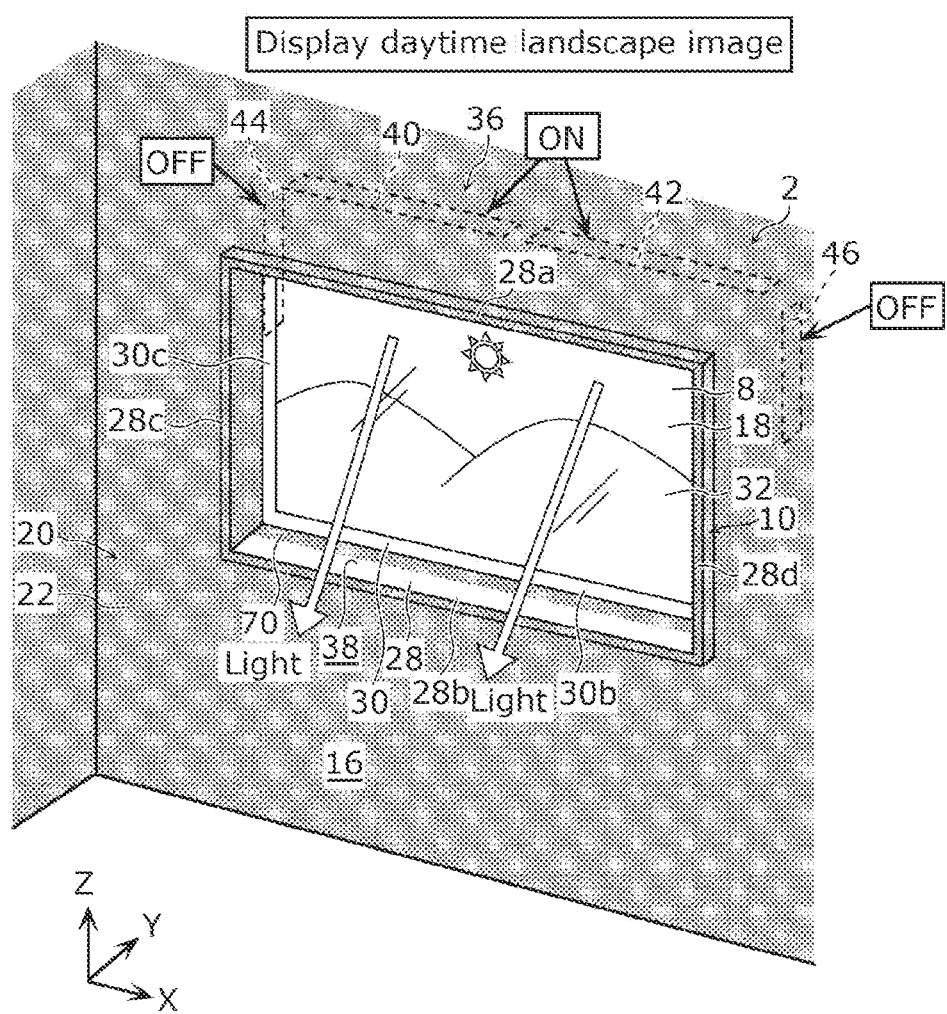
FIG. 8 is a perspective view of the false window unit according to the embodiment when a daytime landscape image is displayed on the image display device.
Figure 9:
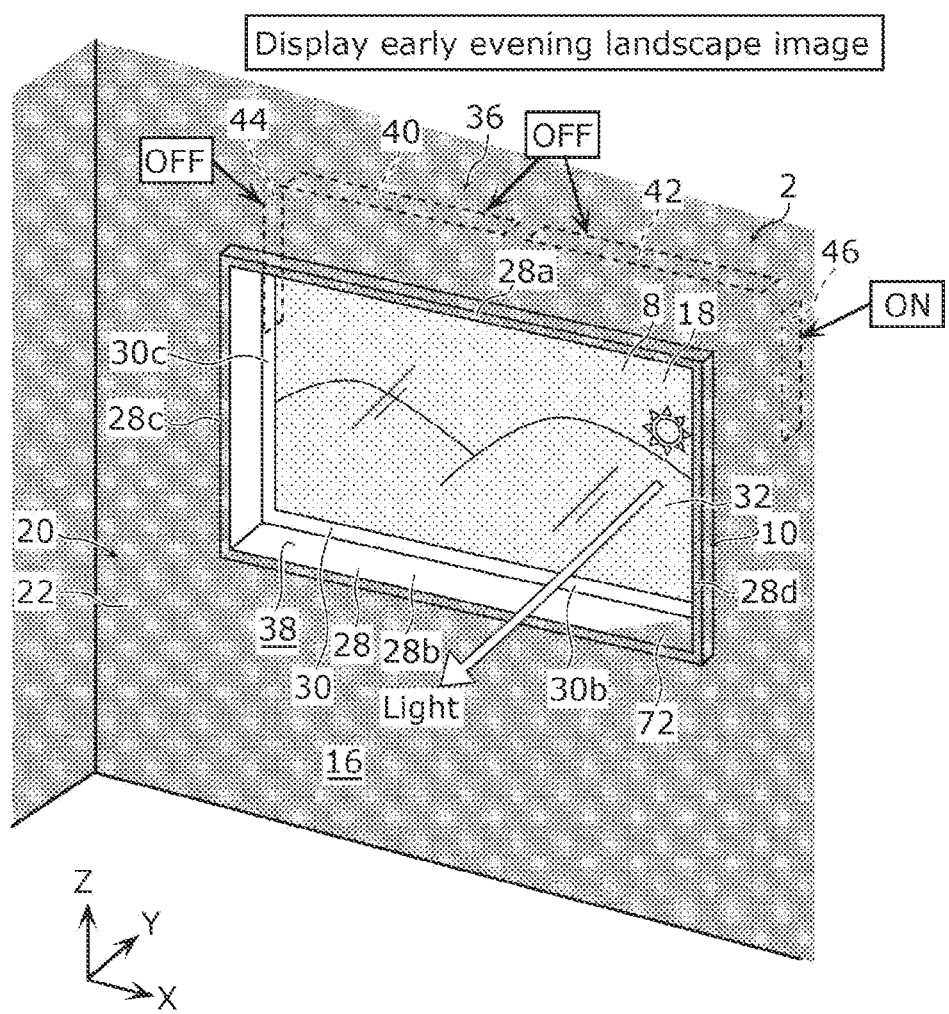
FIG. 9 is a perspective view of the false window unit according to the embodiment when an early evening landscape image is displayed on the image display device.

Hereinafter, an example of control of light source 36 performed by control unit 6 will be described with reference to FIG. 6 to FIG. 9. FIG. 6 illustrates an example of control of light source 36 performed by control unit 6 of false window unit 2 according to the embodiment. FIG. 7 is a perspective view of false window unit 2 according to the embodiment when a morning landscape image is displayed on image display device 8. FIG. 8 is a perspective view of false window unit 2 according to the embodiment when a daytime landscape image is displayed on image display device 8. FIG. 9 is a perspective view of false window unit 2 according to the embodiment when an early evening landscape image is displayed on image display device 8.

First, the case where a morning landscape image is captured by camera 4 will be described with reference to FIG. 6 and FIG. 7. In this case, the shooting condition information obtained by obtainer 64 includes the time in the morning time span (for example, 6:00 am to 9:00 am) as the time when the landscape image was captured.

Controller 66 controls light source 36 based on the shooting condition information from obtainer 64 such that the light from light source 36 simulates the refreshing morning sunlight. Specifically, as illustrated in FIG. 6, based on the shooting condition information from obtainer 64, controller 66 turns on left lateral light source 44, and turns off each of upper left light source 40, upper right light source 42, and right lateral light source 46. Moreover, controller 66 adjusts the illuminance and the color temperature of the light from left lateral light source 44 to a higher illuminance and a higher color temperature, respectively, based on the shooting condition information from obtainer 64.

Controller 66 may respectively adjust the illuminance and the color temperature of the light from left lateral light source 44 to the illuminance and the color temperature that are in accordance with the actual season, weather, or the like, based on the date when the landscape image was captured and the weather or the like of the shooting location when the landscape image was captured which are included in the shooting condition information.

As a result, as illustrated in FIG. 7, a morning landscape image is displayed on display surface 18 of image display device 8. Moreover, from the upper left of window frame 28 as seen from the user in indoor space 16, high-illuminance and high-color-temperature light from left lateral light source 44 that simulates the refreshing morning sunlight is emitted toward indoor space 16 through opening 38 of window frame 28. At this time, part of the light from left lateral light source 44 is blocked by left-side vertical frame 30c of sash frame 30, so that shadow 68 of left-side vertical frame 30c of sash frame 30 is formed at one lengthwise end portion (in the X-axis direction) of the inner peripheral surface of lower horizontal frame 28b of window frame 28. In addition, a shadow is also formed on inner wall 22 and the like of indoor space 16. In FIG. 7, the shadows are represented in gray. As a result, it is possible to reproduce the state that looks like the refreshing morning sunlight is entering indoor space 16 from the east direction (the negative X-axis side) through opening 38 of window frame 28. This enhances the perception of reality.

Next, the case where a daytime landscape image is captured by camera 4 will be described with reference to FIG. 6 and FIG. 8. In this case, the shooting condition information obtained by obtainer 64 includes the time in the daytime time span (for example, 9:00 am to 3:00 pm) as the time when the landscape image was captured.

Controller 66 controls light source 36 based on the shooting condition information from obtainer 64 such that the light from light source 36 simulates the seasonal daytime sunlight. Specifically, as illustrated in FIG. 6, based on the shooting condition information from obtainer 64, controller 66 turns on upper left light source 40 and upper right light source 42, and turns off left lateral light source 44 and right lateral light source 46. Moreover, controller 66 adjusts the illuminance and the color temperature of the light from each of upper left light source 40 and upper right light source 42 to a medium illuminance and a medium color temperature, respectively, based on the shooting condition information from obtainer 64.

Controller 66 may respectively adjust the illuminance and the color temperature of the light from upper left light source 40 and upper right light source 42 to the illuminance and the color temperature that are in accordance with the actual season, weather or the like, based on, for example, the date when the landscape image was captured and the weather at the shooting location when the landscape image was captured which are included in the shooting condition information.

As a result, as illustrated in FIG. 8, a daytime landscape image is displayed on display surface 18 of image display device 8. Moreover, from immediately above window frame 28 as seen from the user in indoor space 16, medium-illuminance and medium-color-temperature light from upper left light source 40 and upper right light source 42 that simulates the daytime sunlight is emitted toward indoor space 16 through opening 38 of window frame 28. At this time, part of the light from upper left light source 40 and upper right light source 42 is blocked by upper horizontal frame 30a (see FIG. 3) of sash frame 30, so that shadow 70 of upper horizontal frame 30a of sash frame 30 is formed at one widthwise end portion (in the Y-axis direction) of the inner peripheral surface of lower horizontal frame 28b of window frame 28. In addition, a shadow is also formed on inner wall 22 and the like of indoor space 16. In FIG. 8, the shadows are represented in gray. As a result, it is possible to reproduce a state that looks like the daytime sunlight is entering indoor space 16 from the south direction (positive Y-axis side) through opening 38 of window frame 28. This enhances the perception of reality.

Finally, the case where an early evening landscape image is captured by camera 4 will be described with reference to FIG. 6 and FIG. 9. In this case, the shooting condition information obtained by obtainer 64 includes the time in the early evening time span (for example, 3:00 pm to 6:00 pm) as the time when the landscape image was captured.

Controller 66 controls light source 36 based on the shooting condition information from obtainer 64 such that the light from light source 36 simulates the twilight sunset. Specifically, as illustrated in FIG. 6, based on the shooting condition information from obtainer 64, controller 66 turns on right lateral light source 46, and turns off upper left light source 40, upper right light source 42, and left lateral light source 44. Moreover, controller 66 adjusts the illuminance and the color temperature of the light from right lateral light source 46 to a lower illuminance and a lower color temperature, respectively, based on the shooting condition information from obtainer 64.

Controller 66 may respectively adjust the illuminance and the color temperature of the light from right lateral light source 46 to the illuminance and the color temperature that are in accordance with the actual season, weather or the like, based on the date when the landscape image was captured and the weather or the like at the shooting location when the landscape image was captured which are included in the shooting condition information.

As a result, as illustrated in FIG. 9, an early evening landscape image is displayed on display surface 18 of image display device 8. Moreover, from the upper right of window frame 28 as seen from the user in indoor space 16, low-illuminance and low-color-temperature light from right lateral light source 46 that simulates the twilight sunset is emitted toward indoor space 16 through opening 38 of window frame 28. At this time, part of the light from right lateral light source 46 is blocked by right-side vertical frame 30d (see FIG. 4) of sash frame 30, so that shadow 72 of right-side vertical frame 30d of sash frame 30 is formed at the other lengthwise end of the inner peripheral surface of lower horizontal frame 28b of window frame 28. In addition, a shadow is also formed on inner wall 22 and the like of indoor space 16. In FIG. 9, the shadows are represented in gray. As a result, it is possible to reproduce a state that looks like the twilight sunset is entering indoor space 16 from the west direction (positive X-axis side) through opening 38 of window frame 28. This enhances the perception of reality.

[4. Advantageous Effects]

As described above, in the present embodiment, false window unit 2 is a false window unit installed in wall 20 of indoor space 16. False window unit 2 includes: window frame 28 which is disposed in wall 20 and includes opening 38; image display device 8 which is disposed facing opening 38 of window frame 28, and displays a landscape image toward indoor space 16 through opening 38 of window frame 28; light source 36 which is disposed between window frame 28 and image display device 8, and emits light simulating sunlight toward indoor space 16 through opening 38 of window frame 28; and a light-blocking member (sash frame 30) that blocks part of the light from light source 36.

With this, since part of the light from light source 36 that simulates the sunlight is blocked by the light-blocking member, for example, shadows 68, 70, 72 of the blocking member are formed on window frame 28. As a result, it is possible to reproduce a state that looks like the sunlight is entering indoor space 16 through opening 38 of window frame 28. This enhances the perception of reality.

Moreover, in the present embodiment, false window unit 2 further includes window plate 32 which covers opening 38 of window frame 28 and is light transmissive; and sash frame 30 which functions as a light-blocking member and extends radially inward from window frame 28 to support the outer peripheral portion of window plate 32. Light source 36 is disposed along window frame 28.

With this, since part of the light from light source 36 that simulates the sunlight is blocked by sash frame 30, for example, shadows 68, 70, and 72 of sash frame 30 can be formed on window frame 28.

Moreover, in the present embodiment, window frame 28 includes upper and lower horizontal frames 30a and 30b and left and right vertical frames 30c and 30d which are arranged in a rectangular shape. Light source 36 includes: upper left light source 40 and upper right light source 42 which are disposed along upper horizontal frame 28a of window frame 28; left lateral light source 44 which is disposed along left-side vertical frame 28c of window frame 28; and right lateral light source 46 which is disposed along right-side vertical frame 28d of window frame 28.

With this, by turning on at least one of upper left light source 40, upper right light source 42, left lateral light source 44, and right lateral light source 46, it is possible to reproduce a state in which the sunlight from an arbitrary direction is entering indoor space 16 through opening 38 of window frame 28. This further enhances the perception of reality.

Moreover, in the present embodiment, false window unit 2 further includes support frame 34 which is rectangular in shape and is disposed between window frame 28 and image display device 8 along the peripheral direction of window frame 28. Upper left light source 40, upper right light source 42, left lateral light source 44, and right lateral light source 46 are supported by support frame 34.

With this, upper left light source 40, upper right light source 42, left lateral light source 44, and right lateral light source 46 can be stably supported by support frame 34.

Moreover, in the present embodiment, false window unit 2 further includes obtainer 64 that obtains shooting condition information related to the shooting conditions of the landscape image, and controller 66 which controls on and off of upper left light source 40, upper right light source 42, left lateral light source 44 and right lateral light source 46 based on the shooting condition information.

With this, for example, by turning on or off upper left light source 40, upper right light source 42, left lateral light source 44, and right lateral light source 46 according to the date, time, weather, or the like when the landscape image was captured, the direction of the light entering indoor space 16 through opening 38 of window frame 28 can be matched with the direction of the sunlight in the landscape image. This further enhances the perception of reality.

Moreover, in the present embodiment, controller 66 further adjusts at least one of the illuminance and the color temperature of the light from each of upper left light source 40, upper right light source 42, left lateral light source 44, or right lateral light source 46 based on the shooting condition information.

With this, for example, by adjusting at least one of the illuminance or the color temperature of the light from each of upper left light source 40, upper right light source 42, left lateral light source 44, and right lateral light source 46 according to the date, time, weather or the like when the landscape image was captured, the illuminance or the color temperature of the light entering indoor space 16 through opening 38 of window frame 28 can be matched with the illuminance or the color temperature of the sunlight in the landscape image, respectively. This further enhances the perception of reality.

Moreover, in the present embodiment, false window 10 is a false window which is installed in wall 20 of indoor space 16, and projects the landscape image displayed on image display device 8. False window 10 includes: window frame 28 which is disposed in wall 20, and includes opening 38 facing image display device 8; light source 36 which is disposed between window frame 28 and image display device 8, and emits light simulating sunlight toward indoor space 16 through opening 38 of window frame 28; and a light-blocking member (sash frame 30) that blocks part of the light from light source 36.

As a result, as described above, it is possible to reproduce a state that looks like the sunlight is entering indoor space 16 through opening 38 of window frame 28. This enhances the perception of reality.

(Other Embodiments)

As described above, the embodiment has been described as an example of the technique disclosed in the present application. However, the technique according to the present disclosure is not limited to such an example, and is applicable to an embodiment in which changes, replacements, additions, omissions, etc. are made as appropriate. It is also possible to combine the structural elements described in the above embodiment to form a new embodiment.

Another embodiment will be described below as an example.

In the above embodiment, obtainer 64 obtains the landscape image from camera 4, but the present disclosure is not limited to such an example. For example, it may be that the landscape image from the camera is stored in a server disposed outside building 12, and that the server streams the landscape image to obtainer 64. In this case, the server may store the shooting condition information from the camera together with the landscape image. Alternatively, the landscape image (recorded video) captured in advance may be stored in the server. As a result, image display device 8 displays the landscape image streamed from the server. In this case, too, controller 66 may control the illuminance, the color temperature or the like of the light from light source 36 based on the shooting condition information obtained from the server.

In the above embodiment, the landscape image from camera 4 is output to image display device 8 via control unit 6, but the present disclosure is not limited to such an example. It may be that camera 4 is omitted, and that a reproduction device is electrically connected to image display device 8. In this case, the reproduction device reproduces the recording medium in which the landscape image is stored, so that obtainer 64 obtains the landscape image and the shooting condition information from the reproduction device. As a result, image display device 8 displays the landscape image (recorded video) reproduced by the reproduction device. In this case, too, controller 66 may control the illuminance, the color temperature or the like of the light from light source 36 based on the shooting condition information obtained from the reproduction device.

In the above embodiment, the light-blocking member is made of sash frame 30, but the present disclosure is not limited to such an example. The light-blocking member may be made of, for example, a louver or a reflector disposed in front of light source 36.

In the above embodiment, LEDs 50 of upper left light source 40 and LEDs 54 of upper right light source 42 are disposed such that the respective optical axes of LEDs 50 and LEDs 54 are vertically oriented (Z-axis direction), but the present disclosure is not limited to such an example. It may be that LEDs 50 of upper left light source 40 and LEDs 54 of upper right light source 42 are obliquely disposed such that the respective optical axes of LEDs 50 and LEDs 54 are inclined toward indoor space 16 with respect to the vertical direction. Alternatively, LEDs 50 and 54 each having a directivity inclined toward indoor space 16 with respect to the vertical direction may be used.

In a similar manner, in the above embodiment, LEDs 58 of left lateral light source 44 and LEDs 62 of right lateral light source 46 are disposed such that the respective optical axes of LEDs 58 and 62 are oriented in the left-right direction (X-axis direction), but the present disclosure is not limited to such an example. It may be that LEDs 58 of left lateral light source 44 and 62 of right lateral light source 46 are disposed obliquely such that the respective optical axes of LEDs 58 and LEDs 62 are inclined toward indoor space 16 with respect to the left-right direction. Alternatively, LEDs 58 and 62 each having a directivity inclined toward indoor space 16 with respect to the left-right direction may be used.

In the above embodiment, one set of false window 10 and image display device 8 are disposed in wall 20 of indoor space 16, but the present disclosure is not limited to such an example. It may be that a plurality of sets of false window 10 and image display device 8 are disposed. In this case, the plurality of sets of false window 10 and image display device 8 are controlled by, for example, single control unit 6.

In the above embodiment, image display device 8 is arranged horizontally such that display surface 18 is in the horizontal (landscape) orientation, but the present disclosure is not limited to such an example. Image display device 8 may be arranged vertically such that display surface 18 is in the vertical (portrait) orientation.

In the above embodiment, the landscape image is a video (a moving image), but the present disclosure is not limited to such an example. The landscape image may be a still image.

In the above embodiment, obtainer 64 obtains, as the shooting condition information from camera 4, a) the date when the landscape image was captured, b) the time when the landscape image was captured, and c) the weather at the shooting location when the landscape image was captured, but the present disclosure is not limited to such an example. For example, obtainer 64 may obtain, for example, d) the aperture of the camera (camera for capturing still images) when capturing a landscape image, e) the shutter speed of the camera when capturing a landscape image, and f) the ISO sensitivity of the camera when capturing a landscape image. In this case, controller 66 is capable of calculating the brightness of the place where the landscape image was captured, based on the aperture, the shutter speed, the ISO sensitivity, or the like from obtainer 64. Controller 66 is capable of adjusting the illuminance and the like of light from each of upper left light source 40, upper right light source 42, left lateral light source 44, and right lateral light source 46 based on the calculated brightness.

In the above embodiment, light source 36 is divided into four light sources (upper left light source 40, upper right light source 42, left lateral light source 44, and right lateral light source 46), but the present disclosure is not limited to such an example. The arrangement and the number of light sources 36 can be set arbitrarily. For example, by increasing the number of light sources 36, shadow can be reproduced more realistically.

Alternatively, obtainer 64 may obtain information (for example, longitude and latitude) related to the position where the landscape image was captured, as the shooting condition information from camera 4. As a result, controller 66 is capable of controlling, for example, on and off of each of upper left light source 40, upper right light source 42, left lateral light source 44, and right lateral light source 46 according to the position where the landscape image was captured.

As described above, the embodiment has been described as an example of the technique disclosed in the present disclosure. To that end, the accompanying drawings and detailed explanations have been provided.

Therefore, the structural elements described in the attached drawings and the detailed description may include not only the structural elements essential for solving the problem but also the structural elements not essential for solving the problem in order to illustrate the technique. Hence, the fact that these non-essential structural elements are described in the accompanying drawings or detailed description should not immediately determine that those non-essential structural elements are essential.

Additionally, since the above described embodiment is for illustrating the examples of the technique in the present disclosure, various changes, replacements, additions, omissions, etc. can be made within the scope of claims or the equivalent scope thereof.

INDUSTRIAL APPLICABILITY

The present disclosure is applicable to, for example, a false window unit installed in the wall of an indoor space.

The invention claimed is:

1. A false window unit which is installed in a wall of an indoor space, the false window unit comprising:
   a window frame which is disposed along a peripheral edge of a through-hole in the wall and includes an opening;
   an image display device including a display surface which is disposed facing the through-hole in the wall and the opening of the window frame and displays a landscape image toward the indoor space through the opening of the window frame;
   a light source which is disposed between the window frame and the image display device and emits light simulating sunlight toward the indoor space through the opening of the window frame; and
   a controller which controls the light source, based on shooting condition information related to a shooting condition of the landscape image transmitted from a camera.

2. The false window unit according to claim 1, further comprising a light-blocking member which blocks part of the light from the light source.

3. The false window unit according to claim 2, further comprising:
   a window plate which covers the opening of the window frame and is light transmissive; and
   a sash frame which functions as the light-blocking member and extends radially inward from the window frame to support an outer peripheral portion of the window plate,
   wherein the light source is disposed along the window frame.

4. The false window unit according to claim 3,
wherein the window frame includes an upper horizontal frame, a lower horizontal frame, a left-side vertical frame, and a right-side vertical frame which are arranged in a rectangular shape, and
the light source includes:
a first light source which is disposed along the upper horizontal frame of the window frame;
a second light source which is disposed along the left-side vertical frame of the window frame; and
a third light source which is disposed along the right-side vertical frame of the window frame.

5. The false window unit according to claim 4, further comprising:
a support frame which is rectangular in shape and is disposed between the window frame and the image display device along a peripheral direction of the window frame,
wherein the first light source, the second light source, and the third light source are supported by the support frame.

6. The false window unit according to claim 5,
wherein the support frame includes an upper horizontal frame, a lower horizontal frame, a left-side vertical frame, and a right-side vertical frame which are arranged in a rectangular shape;
the first light source is disposed in the upper horizontal frame of the support frame;
the second light source is disposed in the left-side vertical frame of the support frame; and
the third light source is disposed in the right-side vertical frame of the support frame.

7. The false window unit according to claim 6,
wherein each of the first light source, the second light source, and the third light source includes:
a substrate which is elongated in shape; and
a plurality of light-emitting diodes (LEDs) aligned in a lengthwise direction of the substrate.

8. The false window unit according to claim 4,
wherein the controller controls on and off of each of the first light source, the second light source, and the third light source, based on the shooting condition information.

9. The false window unit according to claim 8,
wherein the controller controls at least one of an illuminance or a color temperature of light from each of the first light source, the second light source and the third light source, based on the shooting condition information.

10. The false window unit according to claim 1, wherein the shooting condition information includes a date when the landscape image is captured.

11. The false window unit according to claim 1, wherein the shooting condition information includes a time when the landscape image is captured.

12. The false window unit according to claim 1, wherein the shooting condition information includes weather at a shooting location when the landscape image is captured.

13. The false window unit according to claim 1, wherein the landscape image is a video image.

14. The false window unit according to claim 13, wherein the landscape image is a real time image.

15. The false window unit according to claim 1, further comprising the camera configured to communicate with the controller.

16. A false window system, comprising:
a window frame which is disposed along a peripheral edge of a through-hole in a wall of an indoor space and includes an opening;
a camera which captures an image;
an image display device including a display surface which is disposed facing the through-hole in the wall and the opening of the window frame and displays the image transmitted from the camera such that the landscape image is viewable through the opening of the window frame;
a light source which is disposed between the window frame and the image display device and emits light simulating sunlight through the opening of the window frame; and
a controller which controls at least one of an illuminance or a color temperature of light from the light source, based on shooting condition information related to a shooting condition of the landscape image transmitted from the camera.

17. A method of operating a false window system which includes a window frame disposed along a peripheral edge of a through-hole in a wall of an indoor space and having an opening, the method comprising:
obtaining a landscape image by a camera;
displaying the landscape image transmitted from the camera on a display surface of an image display device such that the landscape image is viewable through the opening of the window frame, the display surface being disposed facing the through-hole in the wall and the opening of the window frame;
emitting, from a light source which is disposed between the window frame and the image display device, light simulating sunlight toward through the opening of the window frame; and
a controlling the light source based on shooting condition information related to a shooting condition of the landscape image transmitted from the camera.

18. The method according to claim 17, wherein at least one of an illuminance or a color temperature of the light simulating sunlight is controlled based on the shooting condition information.

19. The method according to claim 18, wherein the shooting condition information includes at least one of a date or time when the landscape image is captured.

20. The method according to claim 18, wherein the shooting condition information includes weather at a shooting location when the landscape image is captured.

* * * * *